(12) United States Patent
Classen et al.

(10) Patent No.: US 7,758,293 B2
(45) Date of Patent: Jul. 20, 2010

(54) APPARATUS FOR LOADING AND/OR UNLOADING A TRANSPORT COMPARTMENT

(75) Inventors: Egbert Classen, Wertingen (DE); Klaus Sohn, Bretten (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 592 days.

(21) Appl. No.: 10/694,599

(22) Filed: Oct. 27, 2003

(65) Prior Publication Data

US 2004/0086362 A1    May 6, 2004

Related U.S. Application Data

(63) Continuation of application No. PCT/EP02/04413, filed on Apr. 22, 2002.

(30) Foreign Application Priority Data

Apr. 26, 2001 (DE) ................. 101 20 576
Jun. 20, 2001 (DE) ................. 101 29 570

(51) Int. Cl.
 *B66F 9/18* (2006.01)
(52) U.S. Cl. .............. 414/621; 414/398; 414/281; 414/626; 414/564; 294/113; 294/87.1
(58) Field of Classification Search .......... 414/398, 414/399, 400, 237, 785, 792.8, 331.11, 348; 214/41; 198/37, 89, 589; 294/119.1, 86.4
See application file for complete search history.

(56) References Cited

U.S. PATENT DOCUMENTS

| | | | | |
|---|---|---|---|---|
| 2,234,287 A | * | 3/1941 | Sluyter | 104/92 |
| 3,093,252 A | * | 6/1963 | Cahill | 414/281 |
| 3,549,192 A | * | 12/1970 | Cassady | 294/106 |
| 3,788,500 A | * | 1/1974 | Lemelson | 414/792.8 |
| 3,961,714 A | * | 6/1976 | Buehler | 414/572 |
| 3,982,745 A | * | 9/1976 | Weil et al. | 270/30.11 |
| 3,993,204 A | * | 11/1976 | Hummel | 414/564 |
| 4,185,944 A | * | 1/1980 | Seaberg | 414/621 |
| 4,360,110 A | * | 11/1982 | Sigman et al. | 212/318 |
| 4,736,971 A | * | 4/1988 | McManus | 294/87.1 |
| 4,930,970 A | * | 6/1990 | Sunderland | 414/542 |
| 5,017,075 A | * | 5/1991 | Block | 212/319 |
| 5,108,255 A | * | 4/1992 | Cornacchia | 414/792.8 |
| 5,161,934 A | * | 11/1992 | Richardson | 414/621 |
| 5,186,596 A | * | 2/1993 | Boucher et al. | 414/395 |
| 5,338,150 A | * | 8/1994 | Focke et al. | 414/799 |
| 5,718,320 A | * | 2/1998 | Marquier et al. | 198/345.3 |

(Continued)

FOREIGN PATENT DOCUMENTS

DE    3431383 A  *  2/1986

(Continued)

*Primary Examiner*—Gregory W Adams
(74) *Attorney, Agent, or Firm*—James E. Howard; Andre Pallapies

(57) ABSTRACT

The invention relates to a device for loading and/or unloading a transport cargo hold, in particular on a good vehicle, comprising at least one transport unit, by means of which goods units, particularly several thereof, may be simultaneously transported. According to the invention, the costs of said device may be reduced and the flexibility increased, whereby the transport unit may at least partly be introduced into the transport cargo hold.

17 Claims, 7 Drawing Sheets

U.S. PATENT DOCUMENTS

| | | | |
|---|---|---|---|
| 5,743,702 A * | 4/1998 | Gunderson | 414/542 |
| 6,508,497 B1 * | 1/2003 | Nerger | 294/86.4 |
| 6,758,326 B1 * | 7/2004 | Benjamin | 198/812 |
| 6,814,219 B2 * | 11/2004 | Shimizu | 198/465.4 |
| 6,923,486 B1 * | 8/2005 | Slagman | 294/115 |
| 2004/0126205 A1 * | 7/2004 | Amoss et al. | 414/138.5 |

FOREIGN PATENT DOCUMENTS

| | | | |
|---|---|---|---|
| FR | 2587692 A * | 3/1987 |
| JP | 61136828 A * | 6/1986 |
| JP | 04012902 A * | 1/1992 |

* cited by examiner

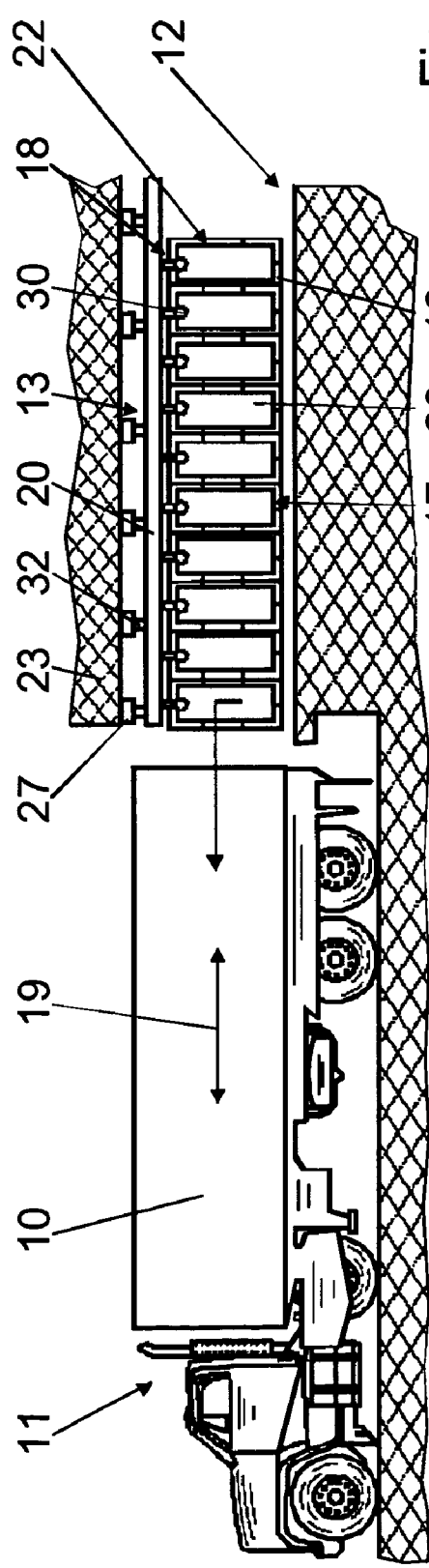
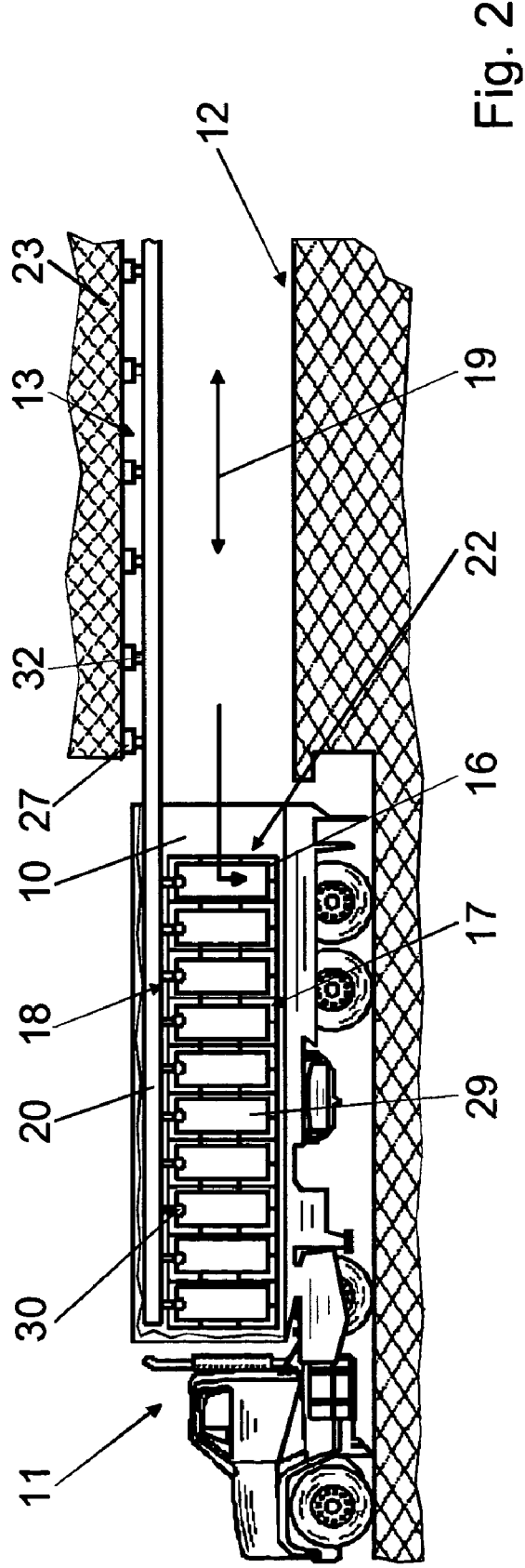

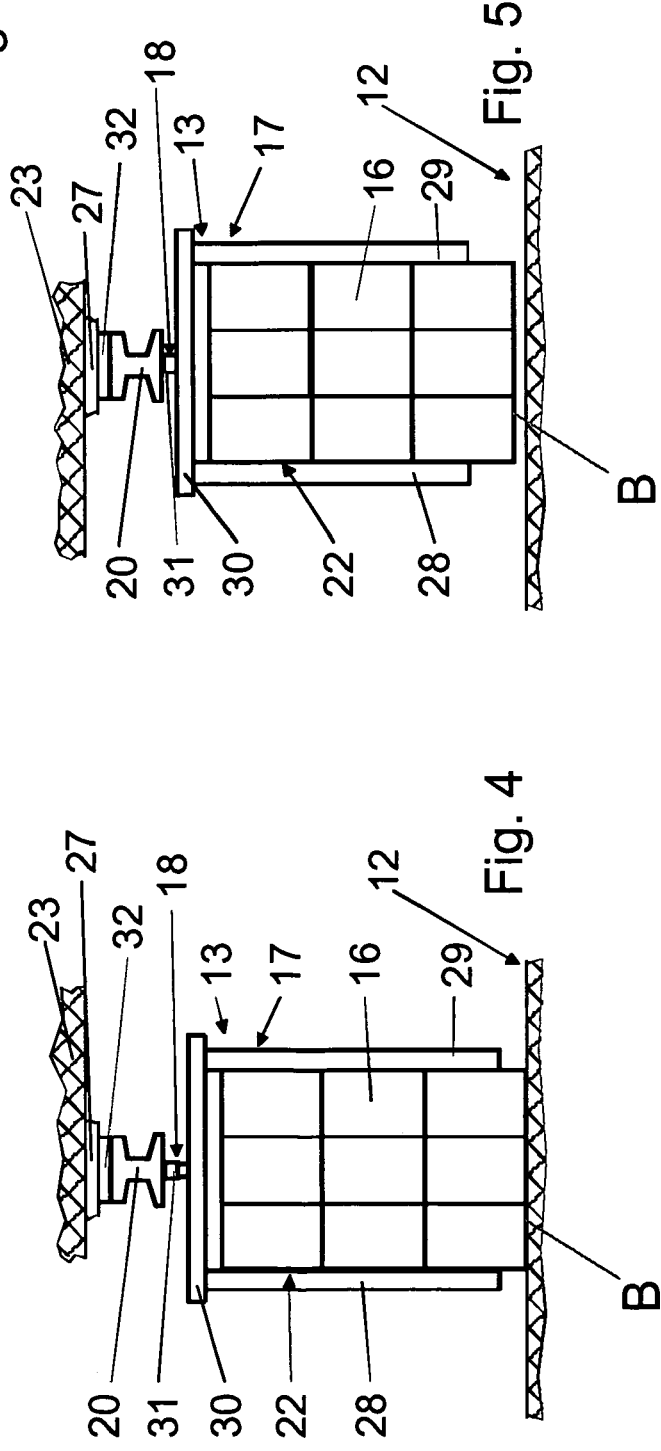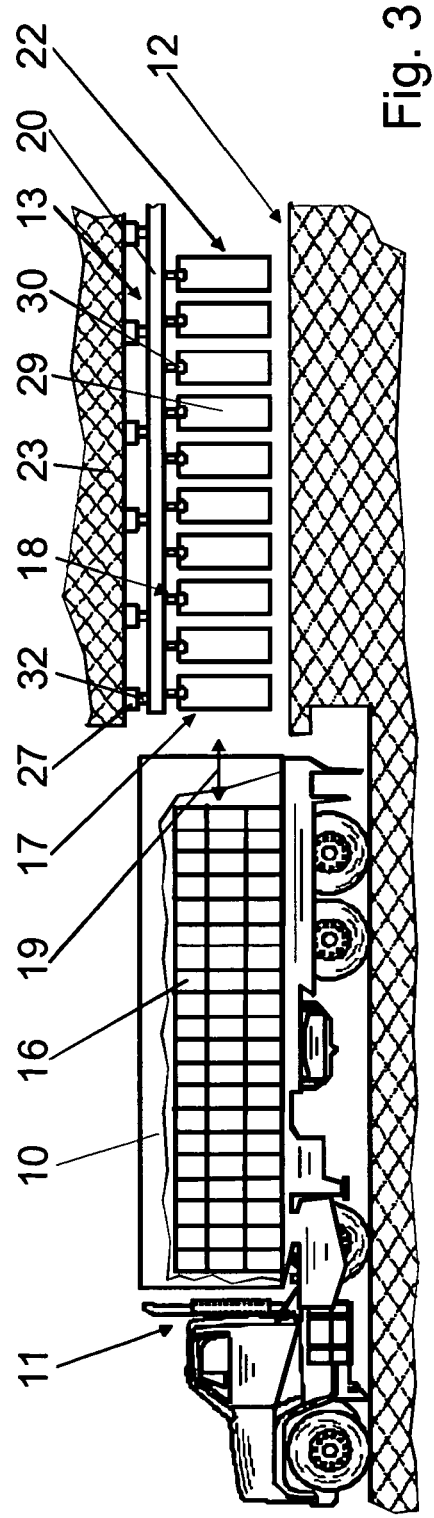

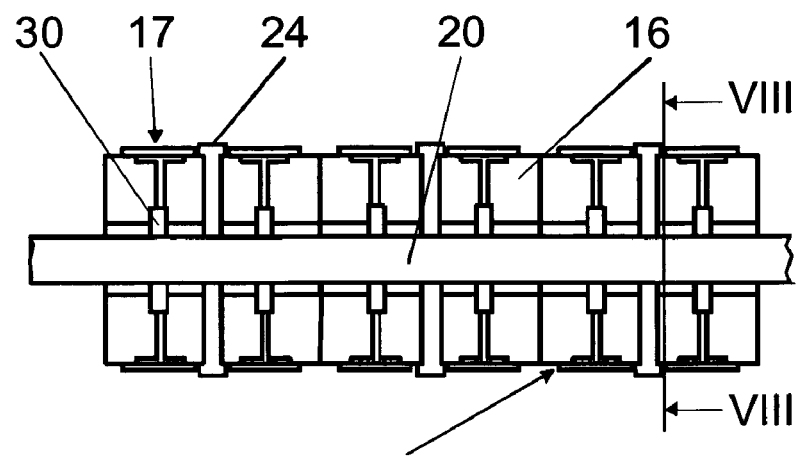
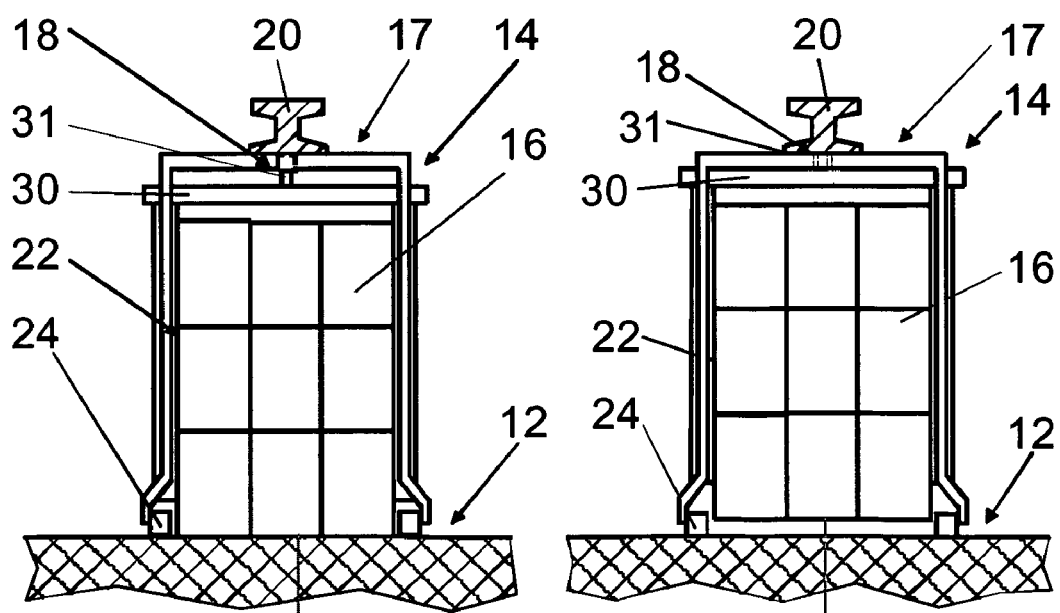

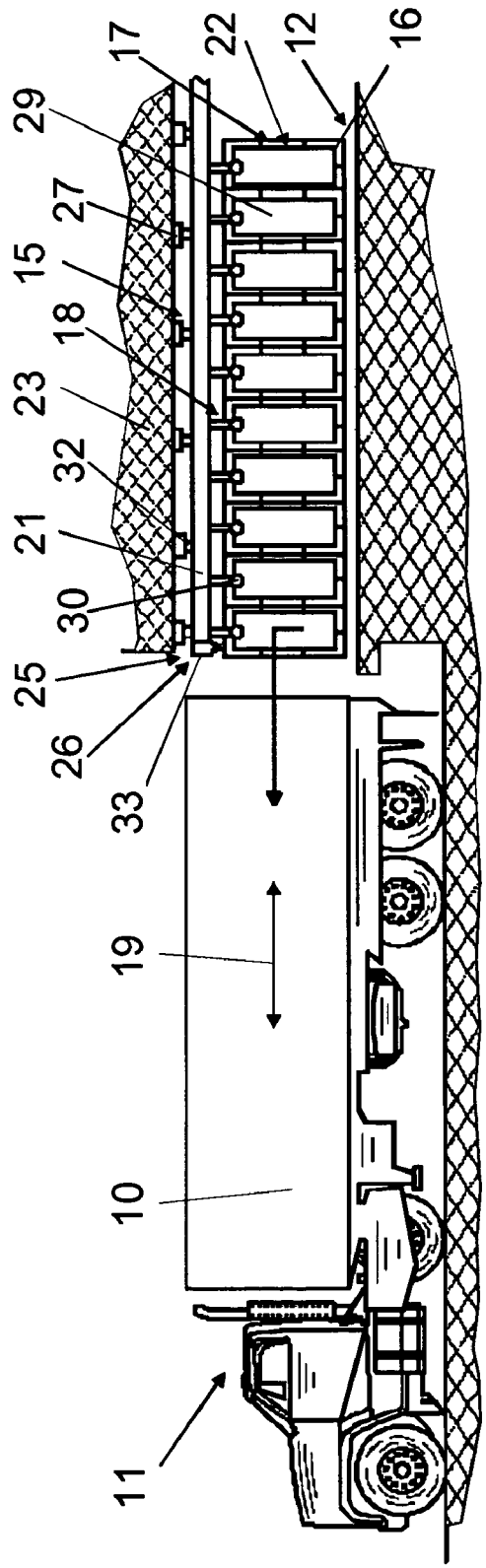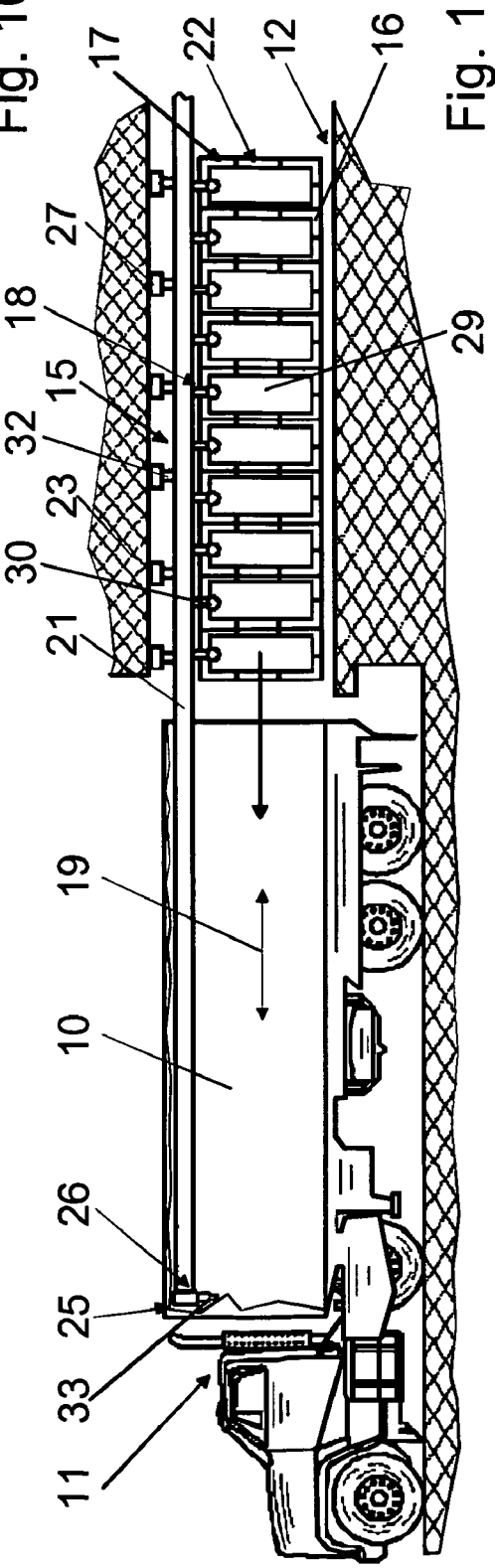

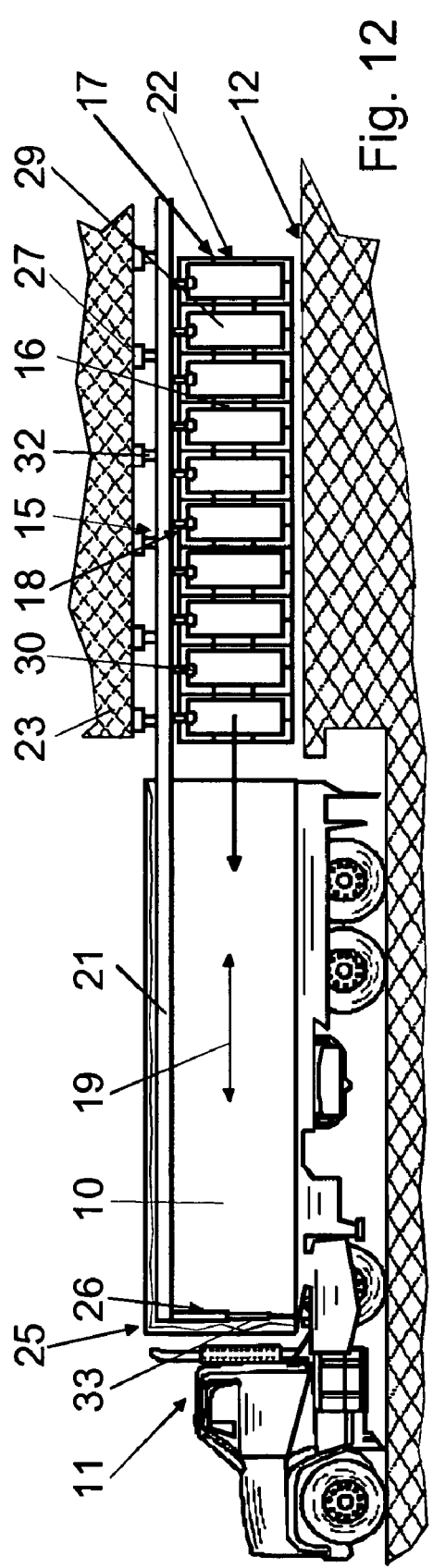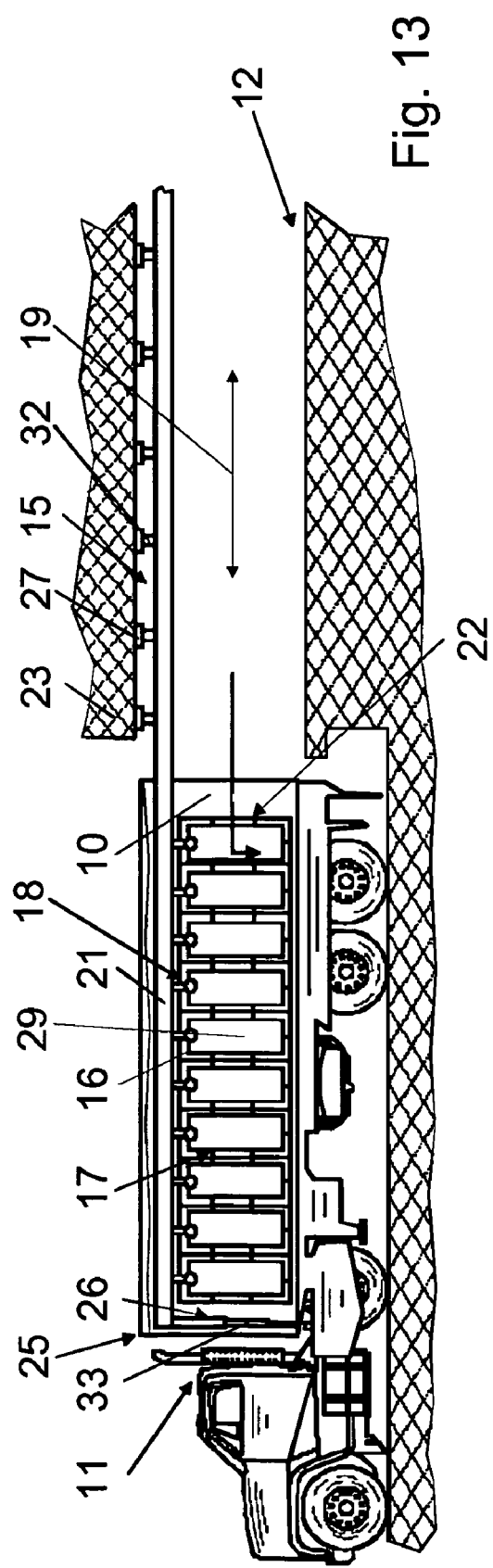

APPARATUS FOR LOADING AND/OR UNLOADING A TRANSPORT COMPARTMENT

CROSS-REFERENCE TO RELATED APPLICATION

This application is a continuation of copending International Application No. PCT/EP02/04413, filed Apr. 22, 2002, which designated the United States and was not published in English.

BACKGROUND OF THE INVENTION

Field of the Invention

The invention is based on an apparatus for loading and/or unloading a transport compartment, in particular, a commercial motor vehicle, having at least one conveying unit by which, in particular, a plurality of goods units can be conveyed simultaneously.

Apparatuses of the generic type for loading and unloading transport compartments of commercial motor vehicles, using conveyor belts, are known. The apparatuses have a first conveyor belt installed in a loading region and a second conveyor belt installed in the transport compartment. To load a transport compartment, a plurality of goods units to be transported is placed on the conveyor belt installed in the loading region. The conveyor belts in the loading region and transport compartment are, then, driven synchronously and the goods units are conveyed into the transport compartment.

SUMMARY OF THE INVENTION

It is accordingly an object of the invention to provide an apparatus for loading and/or unloading a transport compartment that overcomes the hereinafore-mentioned disadvantages of the heretofore-known devices and methods of this general type and that is inexpensive and can be used flexibly and efficiently.

With the foregoing and other objects in view, there is provided, in accordance with the invention, an apparatus for at least one of loading and unloading goods units to and from a transport compartment, including at least one conveying unit being at least partly inserted into the transport compartment and simultaneously conveying a plurality of goods units therein.

The invention is based on an apparatus for loading and/or unloading a transport compartment, in particular, of commercial motor vehicles, with at least one conveying unit through which, in particular, a plurality of goods units can be conveyed simultaneously.

It is proposed that the conveying unit be capable of being inserted at least partly into the transport compartment. The transport compartment can be loaded and/or unloaded completely with a large number of goods units in a few operations, preferably, in one operation, in a short time. Waiting times in loading regions can be reduced, and the level of utilization of commercial vehicles can be increased and, in particular, costly re-equipment of transport compartments with additional special apparatuses can be avoided. Furthermore, advantageous loading and/or unloading of numerous different standard transport compartments and, as a result, particularly flexible use is achieved. The apparatus according to the invention can be used in different areas of application appearing expedient to those skilled in the art, such as when loading and unloading rail containers, ship's containers, and so on, but, in particular, when loading and unloading commercial motor vehicle transport compartments, which can, frequently, be loaded only in their longitudinal direction.

The conveying unit can be constructed as a freely movable unit that has its own drive or can be moved manually or through separate conveying measures, for example, by a lift truck and so on. However, in accordance with another feature of the invention, the conveying unit is, particularly advantageously, installed in a loading region. Simple control of the conveying unit can be achieved and, in particular, existing buildings in the loading region can be used to store parts of the conveying unit, for example, to store a guide and/or support unit, a drive unit, and so on.

If the conveying unit has at least one gripping unit and at least one lifting unit, by which the goods units can be lifted off their base, the goods units can be conveyed into and out of the transport compartment, regardless of floor conditions and, possibly, without a ramp. Flexible handling can be achieved. The gripping unit can be implemented in various ways appearing expedient to those skilled in the art, for example, through the gripping unit, a force-fitting and/or form-fitting connection with the goods units can be produced, and in this case the gripping unit can be driven electrically, hydraulically, pneumatically, and/or manually. A force-locking connection is one that connects two elements together by force external to the elements, as opposed to a form-locking connection, which is provided by the shapes of the elements themselves. If the gripping unit is configured as a clamping unit, various goods units can be gripped simply without the latter having to be configured accordingly with holding elements.

It is conceivable that, using a single gripping unit in the loading/unloading direction, a plurality of goods units, possibly stacked, can be picked up by a single gripping unit. However, if at least two gripping units are provided one after the other in the loading/unloading direction, the goods units can be gripped particularly exactly and securely, specifically, in particular, if a gripping unit is provided for each goods unit in the loading/unloading direction or for each transverse row. Furthermore, small gripping units can be implemented that, for example, in the event of damage or to adapt to changing boundary conditions, such as transport compartments of different lengths, can be replaced, added and/or removed flexibly.

In a further refinement of the invention, it is proposed that the gripping unit be operatively connected to a guide and/or support unit that belongs to the conveying unit and can be inserted into the transport compartment, which means that advantageous guidance and positioning of the goods units can be achieved. The guide and/or support unit can be formed of various components or subassemblies appearing expedient to those skilled in the art, such as a guide frame and so on. However, the guide and/or support unit is, particularly preferably, formed by one or more beams, for example, with a double T section, by which a particularly space-saving construction can be implemented. If the guide-unit is configured in one piece with a support unit, additional components, installation space, installation effort, and costs can be saved.

If the guide and/or support unit is disposed above a holding region of the gripping unit, an advantageously narrow construction can be achieved, specifically in that lateral support and/or guide parts can be avoided. The guide and/or support unit can in this case be mounted in a frame or, advantageously, in a building ceiling that is frequently already present, for example, of a storage building, by which, again, additional components and installation space can be saved. In principle, however, the guide and/or support unit can also be disposed at the side of a pick-up region of the gripping unit.

Furthermore, it is proposed that the gripping unit be mounted such that it can be displaced on the guide and/or support unit, for example, through antifriction bearings or sliding bearings. Loading by the weight of the goods units during the insertion of the guide and/or support unit into the transport compartment can be avoided, and inexpensive mounting of the guide and/or support unit can be implemented. Furthermore, on the guide and/or support unit, at its end pointing in the direction of the transport compartment, a supporting element can, advantageously, be provided, for example, a supporting foot that can be extended telescopically and that can be extended following the insertion of the guide and/or support unit into the transport compartment and before the conveyance of the goods units. Large moments acting on the guide and/or support unit on account of long lever arms can be avoided, and an inexpensive construction can be achieved.

If the gripping unit has at least a second degree of freedom of movement in addition to a first degree of freedom of movement, the apparatus can be matched flexibly to a position of the transport compartment and/or to a position of the goods units provided. The gripping unit can be configured such that it can be pivoted about one or more axes and moved translationally in one or more directions. Here, the gripping unit can be configured to be mounted appropriately on the guide and/or support unit and/or the guide and/or support unit can be configured to be mounted appropriately. If the gripping unit can be moved transversely over a crossmember, a number of goods units provided transversely with respect to the loading/unloading direction can, in particular, be gripped simply and conveyed. Corresponding crossmembers can be implemented particularly simply if the guide and/or support unit is mounted on a building ceiling. Instead of a crossmember, it is, in principle, also conceivable to construct a floor element of a loading region to be moved in various directions in order to bring goods units into a gripping region of the conveying unit.

The gripping unit can be configured such that it can be driven about various axes and in various directions and/or mounted such that it can, advantageously, be moved freely or floating, at least with respect to one degree of freedom of movement, during the loading and/or unloading operation so that the gripping unit can automatically adapt, at least to a limited extent, to a position of the transport compartment and also to a position of the goods units provided. To achieve the situation where the gripping unit is freely movable with regard to at least one degree of freedom of movement, it can be expedient to decouple the gripping unit at least partly from a drive unit that could hamper free movement as a result of resistance forces.

If at least one goods unit can be supported by supporting rollers, specifically, in particular, on a floor of the transport compartment and/or on a floor of the loading region, complicated mounting of a support unit can be avoided. The support unit can be assisted or completely replaced in its function by the supporting rollers. Instead of supporting rollers, anti-bending units are also conceivable, for example, having a plunger that acts on the support unit and is driven hydraulically, pneumatically, and/or electrically. Anti-bending units are known, in particular, from the calendering engineering sector.

With the objects of the invention in view, there is also provided a In a commercial motor vehicle, an apparatus for at least one of loading and unloading goods units to and from a transport compartment of the vehicle, the apparatus including at least one conveying unit at least partly inserted into the transport compartment and simultaneously conveying a plurality of goods units therein.

With the objects of the invention in view, there is also provided an apparatus for at least one of loading and unloading goods units to and from a transport compartment in a loading and unloading direction, the goods units having a base, the apparatus including at least one conveying unit being at least partly inserted into the transport compartment and simultaneously conveying a plurality of goods units therein and having at least two gripping units disposed one after another in the loading and unloading direction for insertion into the transport compartment, at least two lifting units for lifting the goods units off of their base, and at least one guide and support unit operatively connected to the gripping unit.

With the objects of the invention in view, there is also provided a method of at least one of loading and unloading a transport compartment, including the steps of providing an apparatus for at least one of loading and unloading goods units to and from the transport compartment with at least one conveying unit and at least partly inserting the conveying unit into the transport compartment and simultaneously conveying a plurality of the goods units therein.

With the objects of the invention in view, there is also provided a method of at least one of loading and unloading a transport compartment with goods units having a base, including the steps of providing an apparatus for at least one of loading and unloading the goods units to and from the transport compartment in a loading and unloading direction with at least one conveying unit, disposing at least two gripping units one after another in the loading and unloading direction on the conveying unit, providing the conveying unit with at least two lifting units for lifting the goods units off of their base, operatively connecting at least one guide and support unit to the gripping units, and at least partly inserting the conveying unit and at least one of the gripping units into the transport compartment and simultaneously conveying a plurality of the goods units therein.

Other features that are considered as characteristic for the invention are set forth in the appended claims.

Although the invention is illustrated and described herein as embodied in an apparatus for loading and/or unloading a transport compartment, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a fragmentary, partially cross-sectional and partially side elevational side view of an apparatus according to the invention during a loading operation before the insertion of a support beam into a transport compartment;

FIG. 2 is a fragmentary, partially cross-sectional and partially elevational side view of the apparatus of FIG. 1 following the insertion of the support beam into the transport compartment;

FIG. 3 is a fragmentary, partially cross-sectional and partially elevational side view of the apparatus of FIG. 2 after the loading operation;

FIG. 4 is a fragmentary, partially cross-sectional and partially elevational front view of the apparatus of FIG. 1 before a lifting operation;

FIG. 5 is a fragmentary, partially cross-sectional and partially elevational front view of the apparatus of FIG. 4 after the lifting operation;

FIG. 7 is a fragmentary, partially cross-sectional and partially elevational top view of an alternative embodiment of the apparatus of FIG. 1 with supporting rollers;

FIG. 8 is a fragmentary, partially cross-sectional and partially elevational front view of the apparatus of FIG. 7 before a lifting operation along the line VIII-VIII in FIG. 7;

FIG. 9 is a fragmentary, partially cross-sectional and partially elevational front view of the apparatus of FIG. 7 after a lifting operation along the line VIII-VIII in FIG. 7;

FIG. 10 is a fragmentary, partially cross-sectional and partially elevational side view of an alternative embodiment of the apparatus of FIG. 1 with a separately insertable support beam before a loading operation;

FIG. 11 is a fragmentary, partially cross-sectional and partially elevational side view of the apparatus of FIG. 10 following the insertion of the support beam into a transport compartment;

FIG. 12 is a fragmentary, partially cross-sectional and partially elevational side view of the apparatus of FIG. 11 with the supporting foot extended;

FIG. 13 is a fragmentary, partially cross-sectional and partially elevational side view of the apparatus of FIG. 12 after the loading operation.

DESCRIPTION OF THE PREFERRED EMBODIMENTS

Figure 6:
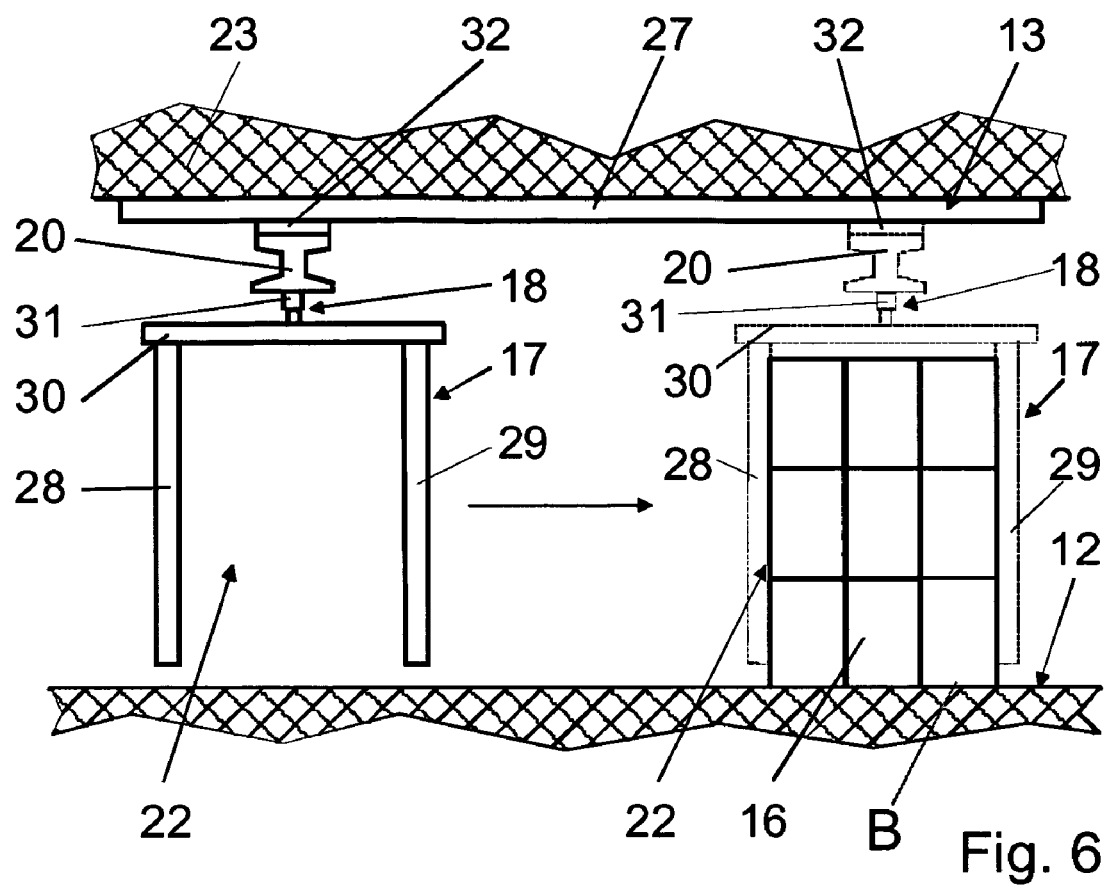
FIG. 6 is a fragmentary, partially cross-sectional and partially elevational front view of the apparatus of FIG. 1 when gripping new goods units.

Referring now to the figures of the drawings in detail and first, particularly to FIG. 1 thereof, there is shown a schematically illustrated apparatus for loading and unloading transport compartments 10, specifically, commercial motor vehicles 11. The apparatus includes a conveying unit 13 that is installed in a loading region 12 and by which a plurality of goods units 16 can be conveyed simultaneously from the unloading region 12 into the transport compartment 10.

The conveying unit 13 has a support beam 20 that is mounted through a guide unit 32 and through crossmembers 27 on a building ceiling 23 of a storage building, not specifically illustrated. The conveying unit 13 has a double T section, on which ten clamping units 17 are fixed one after another in the loading/unloading direction. The support beam 20 is disposed above a holding region 22 of the clamping units 17. The clamping units 17 have two substantially vertically aligned legs 28, 29 and a crossbeam 30, on which the legs 28, 29 are mounted such that they can be moved toward each other and driven hydraulically (FIGS. 4 and 5).

The crossbeam 30 is connected to the support beam 20 through a hydraulic reciprocating cylinder 31 that forms a lifting unit 18, by which the goods units 16 in the clamping units 17 can be lifted off their base (B). It is also possible to provide a lifting unit between the legs 28, 29 or to configure the support beam 20 such that it can be lifted by a central lifting unit.

To load the transport compartment 10, goods units 16 provided with the clamping units 17, disposed beside one another in three rows and stacked threefold above one another, are traveled over. In the process, the support beam 20 with the guide unit 32 is moved in the crossmembers 27 fixed to the building ceiling 23, transversely with respect to the loading/unloading device 19, in front of or behind the goods units 16 provided, and, then, moved over the goods units 16 in the longitudinal direction in the guide unit 32 (see FIG. 6). Given sufficiently high buildings, it would also be conceivable for the clamping units 17 to be raised by a lifting unit until the clamping units 17 can be moved transversely over the goods units 16 provided.

Once the legs 28, 29 of the clamping units 17, come to lie in their desired position laterally beside the goods units 16, the goods units 16 are gripped by the clamping units 17, to be specific, preferably, nine goods units 16 or one transverse row of goods units 16 per clamping unit 17 or, in the case of an overlapping gripping technique, eighteen goods units 16.

Once the goods units 16 are fixed securely in the clamping units 17, they are, respectively, lifted off their base (B) by the reciprocating cylinders 31 of the lifting unit 18. Then, the support beam 20 with the clamping units 17 and the goods units 16 secured therein are introduced into the transport compartment 10 (from FIG. 1 to FIG. 2). The support beam 20 is displaced in the longitudinal direction in the guide unit 32. To achieve a situation where the conveying unit 13 can match the position of the transport compartment 10, the support beam 20 can move freely in the transverse direction in the crossmembers 27 during the insertion into the transport compartment 10. To compensate for an angular offset, it is also conceivable to configure the support beam 20 such that it can be pivoted about a vertical and/or horizontal axis.

After the goods units 16 have been inserted into the transport compartment 10, the goods units 16 are set down on a floor of the transport compartment 10 by the lifting unit 18, and the clamping units 17 are opened. The support beam 20 with the clamping units 17 is, then, guided out of the transport compartment 10 (see FIG. 3).

During an unloading operation of the transport compartment 10 (illustrated, for example, from FIG. 2 to FIG. 1), the support beam 20 with the empty clamping units 17 is guided over the goods units 16 in the transport compartment 10, the clamping units 17 are closed, the goods unit 16 are lifted by the lifting unit 18 and, then, the support beam 20 with the clamping units 17 and the goods units 16 fixed therein is conveyed out of the transport compartment 10.

Figure 14:
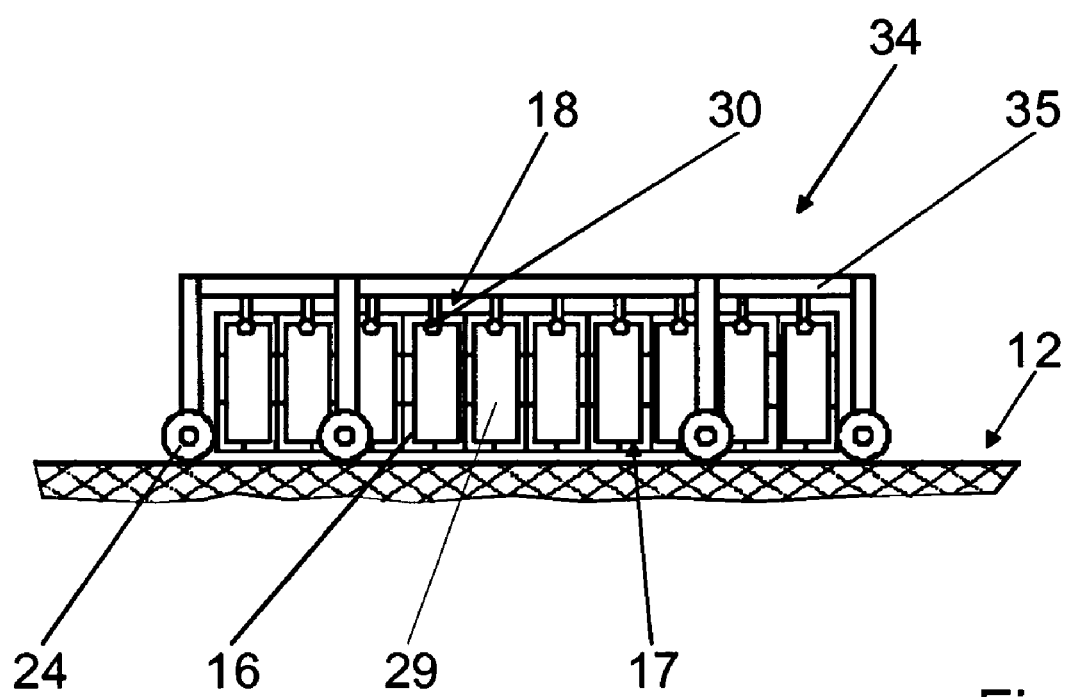
FIG. 14 is a fragmentary, partially cross-sectional and partially elevational side view of an alternative embodiment of the apparatus of FIG. 7 with a freely movable conveying unit.

A first alternative apparatus is illustrated in FIGS. 7 to 9, a second alternative apparatus is illustrated in FIGS. 10 to 13, and a third alternative apparatus is illustrated in FIG. 14. Substantially constant components are in principle numbered with the same reference symbols. Furthermore, with regard to constant features and functions, reference can be made to the description of the exemplary embodiment in FIGS. 1 to 6. The following description is substantially restricted to the differences with respect to the exemplary embodiment in FIGS. 1 to 6.

The apparatus in FIGS. 7 to 9 has a conveying unit 14 in which supporting rollers 24 are fixed to a support beam 20 by U-shaped frames. Goods units 16 to be transported can be supported on a floor of a loading region 12 and on a floor of a transport compartment 10 by clamping units 17, the support beam 20, the U-shaped frames, and by the supporting rollers 24. The support beam 20 is assisted in its supporting function by the supporting rollers 24 and is used substantially for lateral guidance. To achieve the situation where the clamping units 17 with the goods units 16 can follow a floor inclination, in particular, in the transport compartment 10, the support beam 20 is mounted such that it can move freely in the vertical direction.

The apparatus in FIGS. 10 to 13 has a conveying unit 15 in which clamping units 17 are mounted such that they can be displaced on a support beam 21, to be specific, through anti-friction bearings not specifically illustrated. To load a transport compartment 10, firstly, the support beam 21 is inserted into the transport compartment 10 without the clamping units 17. Fixed to the support beam 21, at its end 25 pointing in the direction of the transport compartment 10, is a supporting element 26 that is formed by a telescopic supporting foot 33 that can be extended hydraulically.

Once the support beam 21 has been inserted completely into the transport compartment 10 (FIG. 11), the supporting foot 33 is extended as shown in FIG. 12. Then, the clamping units 17, with the goods units 16 secured therein and lifted by a lifting unit 18, are conveyed into the transport compartment 10 in a suspended manner along the support beam 21 (FIG. 13).

After the goods units 16 have been set down by the lifting unit 18, after the clamping units 17 have been opened, and after the supporting foot 33 has been retracted again, the support beam 21, together with the clamping units 17, is guided out of the transport compartment 10.

The apparatus in FIG. 14 has a freely movable conveying unit 34, in which supporting rollers 24 are fixed to a support unit 35 through U-shaped frames. Goods units 16 to be transported can be supported on a floor of a loading region 12 and on the floor of a transport compartment 10 through clamping units 17, the support unit 35, the U-shaped frames, and the supporting rollers 24. The conveying unit 34 can be driven with a non-illustrated integrated motor and can be controlled by radio, for example. In principle, however, it would also be conceivable for the conveying unit 34 to be moved by a lift truck or be moved manually.

We claim:

1. An apparatus for at least one of loading and unloading multi-piece goods units to and from a transport compartment in a loading and unloading direction, the apparatus comprising:
   at least one conveying unit being at least partly inserted into the transport compartment and simultaneously conveying a plurality of multi-piece goods units therein; having:
   a plurality of beam guide members fixed to an overhead support structure;
   a unitary traveling support beam operatively connected to the beam guide members for reciprocating travel into and out of the transport compartment;
   at least two gripping units operatively mounted to the unitary support beam for movement therewith and disposed in spaced succession therealong for movement into and out of the transport compartment, each gripping unit including a laterally oriented crossbeam and two fixed length elongate legs mounted to said crossbeam and being movable with respect to one another, the multi-piece goods units being clamped between the two fixed length elongate legs in general centered alignment with respect to the support beam when the gripping unit engages the multi-piece goods units;
   at least two lifting units mounted to said crossbeam for lifting the multi-piece goods units in a generally vertical direction perpendicular to the loading and unloading direction for movement of the multi-piece goods units into and out of the transport compartment.

2. The apparatus according to claim 1, wherein said conveying unit is installed fixedly in a loading region; and is movable upon supporting rollers in the loading region.

3. The apparatus according to claim 1, wherein:
   at least one of said gripping units has pick-up region; and
   said guide and support unit is disposed above said pick-up region.

4. The apparatus according to claim 3, wherein:
   said conveying unit is installed fixedly in a loading region of a building; and
   said guide and support unit is to be mounted on an overhead portion of the building.

5. The apparatus according to claim 1, wherein at least one of said gripping units is mounted displaceably on said guide and support unit.

6. The apparatus according to claim 1, wherein said guide and support unit has: an end pointing in a direction of the transport compartment; and a supporting element disposed at least at said end.

7. The apparatus according to claim 1, wherein said gripping units move with at least two degrees of freedom.

8. The apparatus according to claim 1, wherein said gripping units move freely with regard to at least one degree of freedom during at least one of a loading operation and an unloading operation.

9. The apparatus according to claim 1, wherein said conveying unit has supporting rollers for supporting at least one multi-piece goods unit.

10. The apparatus according to claim 1, wherein transport compartment is a commercial motor vehicle.

11. An apparatus for at least one of loading and unloading multi-piece goods units to and from a transport compartment, the apparatus comprising:
    a plurality of beam guide members fixed to an overhead support structure;
    a unitary traveling support beam operatively connected to the beam guide members and extending in a substantially horizontal direction for reciprocating travel into and out of the transport compartment for depositing the multi-piece goods units in the transport compartment or retrieving multi-piece goods units from the transport compartment;
    a crossbeam extending in a direction substantially transverse to the support beam, mounted operatively thereto and having a first end and a second end disposed opposite the first end;
    a fixed length elongate first leg connected to the first end of the crossbeam and extending downwardly in a substantially vertical direction from the crossbeam;
    a fixed length elongate second leg connected to the second end of the crossbeam and extending downwardly in a substantially vertical direction from the crossbeam, the first and second legs having respective length dimensions sufficient to extend beyond individual pieces of the multi-piece goods units and being movable toward one another to clamp the multi-piece goods units and away from one another to release the multi-piece goods units; and
    a hydraulic cylinder connecting the crossbeam to the support beam, the cylinder being movable between a retracted condition, in which the crossbeam is moved toward the support beam to lift the multi-piece goods units, and an extended condition, in which the crossbeam is moved away from the support beam to lower the multi-piece goods units.

12. The apparatus according to claim 11, wherein the crossbeam is connected to the support beam for translational movement with respect to the support beam to center the crossbeam and the multi-piece goods units with respect to the transport container.

13. The apparatus according to claim 11, wherein the crossbeam is connected to the support beam for pivotal movement with respect to the support beam for alignment of said crossbeam and said multi-piece goods units with respect to the transport container.

14. The apparatus according to claim 11, wherein the crossbeam includes a hydraulic driver for moving the first and second legs with respect to one another, the hydraulic driver being movable between a clamped condition, in which the legs are moved toward one another to engage the sides of the goods units with a force-locking connection, and a unclamped condition, in which the legs are moved away from one another to disengage the goods units.

15. The apparatus according to claim 11, wherein the legs do not extend below the goods units and the goods units are free of any support between the goods units and a floor surface.

16. The apparatus according to claim 11, further comprising a frame having rollers and supporting the support beam.

17. A method for moving multi-piece goods units between a loading region and a transport compartment, the method comprising the steps of:
providing a conveying unit including a plurality of beam guide members fixed to an overhead support structure and a unitary traveling support beam operatively connected to the beam guide members and extending in a substantially horizontal direction for reciprocating travel into and out of the transport compartment for depositing the multi-piece goods units in the transport compartment or retrieving multi-piece goods units from the transport compartment, at least one gripping unit having a crossbeam and two fixed length elongate legs extending therefrom, said legs being movable with respect to one another to engage the multi-piece goods units, and at least one lifting unit mounted to said crossbeam and connecting the at least one gripping unit to the support beam;
positioning the gripping unit adjacent the multi-piece goods units in at least one of the loading region and the transport compartment;
engaging the multi-piece goods units with the gripping unit by moving the legs toward one another to clamp the multi-piece goods units and apply opposing forces on opposite sides of the multi-piece goods units;
lifting the multi-piece goods units with the lifting unit;
moving the support beam, thereby transporting the gripping unit and the multi-piece goods unit to the other of the loading region and the transport compartment;
lowering the multi-piece goods units back on the base with the lifting unit; and
disengaging the multi-piece goods units from the gripping unit by moving the legs away from one another to unclamp the multi-piece goods units.

* * * * *